United States Patent
Carnevali

(10) Patent No.: US 9,669,906 B2
(45) Date of Patent: Jun. 6, 2017

(54) QUARTER-TURN ADAPTER FOR FLUSH MOUNT RECEPTACLE BASES

(71) Applicant: Jeffrey D. Carnevali, Seattle, WA (US)

(72) Inventor: Jeffrey D. Carnevali, Seattle, WA (US)

( * ) Notice: Subject to any disclaimer, the term of this patent is extended or adjusted under 35 U.S.C. 154(b) by 188 days.

(21) Appl. No.: 14/553,818

(22) Filed: Nov. 25, 2014

(65) Prior Publication Data

US 2016/0146235 A1    May 26, 2016

(51) Int. Cl.
| | |
|---|---|
| E05B 73/00 | (2006.01) |
| F16B 2/18 | (2006.01) |
| F16B 21/04 | (2006.01) |
| B63B 35/79 | (2006.01) |
| F16B 37/04 | (2006.01) |
| F16B 12/20 | (2006.01) |
| F16B 33/00 | (2006.01) |

(52) U.S. Cl.
CPC ........ *B63B 35/7933* (2013.01); *E05B 73/007* (2013.01); *F16B 2/18* (2013.01); *F16B 21/04* (2013.01); *F16B 37/042* (2013.01); *B63B 2035/794* (2013.01); *F16B 33/006* (2013.01); *F16B 2012/2018* (2013.01)

(58) Field of Classification Search
CPC ........ F16B 2/18; F16B 12/20; F16B 12/2009; F16B 2012/2018; F16B 2012/2072; F16B 21/02; F16B 21/04; Y10S 403/08; Y10S 403/12; A47B 2230/0048; E05B 73/007; Y10T 403/7005; Y10T 403/7009; B63B 35/7933; B63B 2035/794
See application file for complete search history.

(56) References Cited

U.S. PATENT DOCUMENTS

| | | | |
|---|---|---|---|
| 1,955,740 A | | 9/1931 | Dzus |
| 2,337,457 A | | 1/1942 | Dzus |
| 3,222,744 A | * | 12/1965 | Dellith ............. F16B 21/02 411/337 |

(Continued)

FOREIGN PATENT DOCUMENTS

| | | | | |
|---|---|---|---|---|
| GB | 1200049 A | * | 7/1970 | ............. F16B 21/02 |
| GB | 1200050 A | * | 7/1970 | ............. F16B 21/02 |

(Continued)

*Primary Examiner* — Ryan Kwiecinski
(74) *Attorney, Agent, or Firm* — Charles J. Rupnick; Attorney at Law

(57) ABSTRACT

An adapter for mounting a mounting structure on a flush mount receptacle base. The adapter includes a mounting base and an anchor. The mounting base includes a rotatable drive member with an interface surface configured and arranged for placement on a mounting surface, the rotatable member also has a bore extending thereinto and aligned with the interface surface, and the bore is at least partially threaded.

The anchor extends into the bore of the drive member, the anchor has a shaft with first and second end portions and defining a center axis, the first end portion of the shaft is threaded to mate with the threaded bore of the drive member and configured and arranged to rotate relative to the drive member, the anchor also has at least one hook coupled to the second end portion of the shaft and laterally offset from the center axis of the shaft.

21 Claims, 9 Drawing Sheets

(56) References Cited

U.S. PATENT DOCUMENTS

| | | | | |
|---|---|---|---|---|
| 3,452,404 | A | * | 7/1969 | Metz ........................ F16B 21/02 24/573.11 |
| 3,495,307 | A | * | 2/1970 | Metz ........................ F16B 5/10 411/555 |
| 3,585,824 | A | * | 6/1971 | Schenk ..................... F16B 5/10 411/555 |
| 3,594,876 | A | * | 7/1971 | Gunther ................... F16B 21/04 411/555 |
| 4,398,322 | A | * | 8/1983 | Ewen ....................... F16B 21/04 24/595.1 |
| 4,653,970 | A | * | 3/1987 | Ballantyne ................ F16B 5/10 29/432 |
| 4,820,220 | A | * | 4/1989 | Fruzzetti ............. B63B 35/7933 24/115 K |
| 4,938,040 | A | * | 7/1990 | Humphreys, Jr. .. E05B 73/0005 70/14 |
| 5,119,649 | A | * | 6/1992 | Spence ............... B63B 35/7946 114/172 |
| 2011/0211921 | A1 | * | 9/2011 | Volokh ................... B23B 31/113 407/40 |
| 2015/0030386 | A1 | * | 1/2015 | Carnevali ................ F16B 21/02 403/348 |
| 2015/0275942 | A1 | * | 10/2015 | Carnevali ................ F16B 2/10 403/374.3 |

FOREIGN PATENT DOCUMENTS

| | | | |
|---|---|---|---|
| WO | WO 9422711 A1 * | 10/1994 | ............. B63B 21/04 |
| WO | WO 2009025877 A2 * | 2/2009 | ............. F16B 47/00 |

* cited by examiner

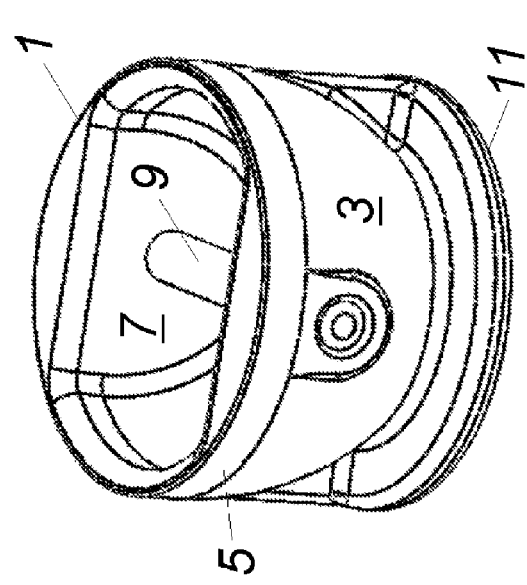
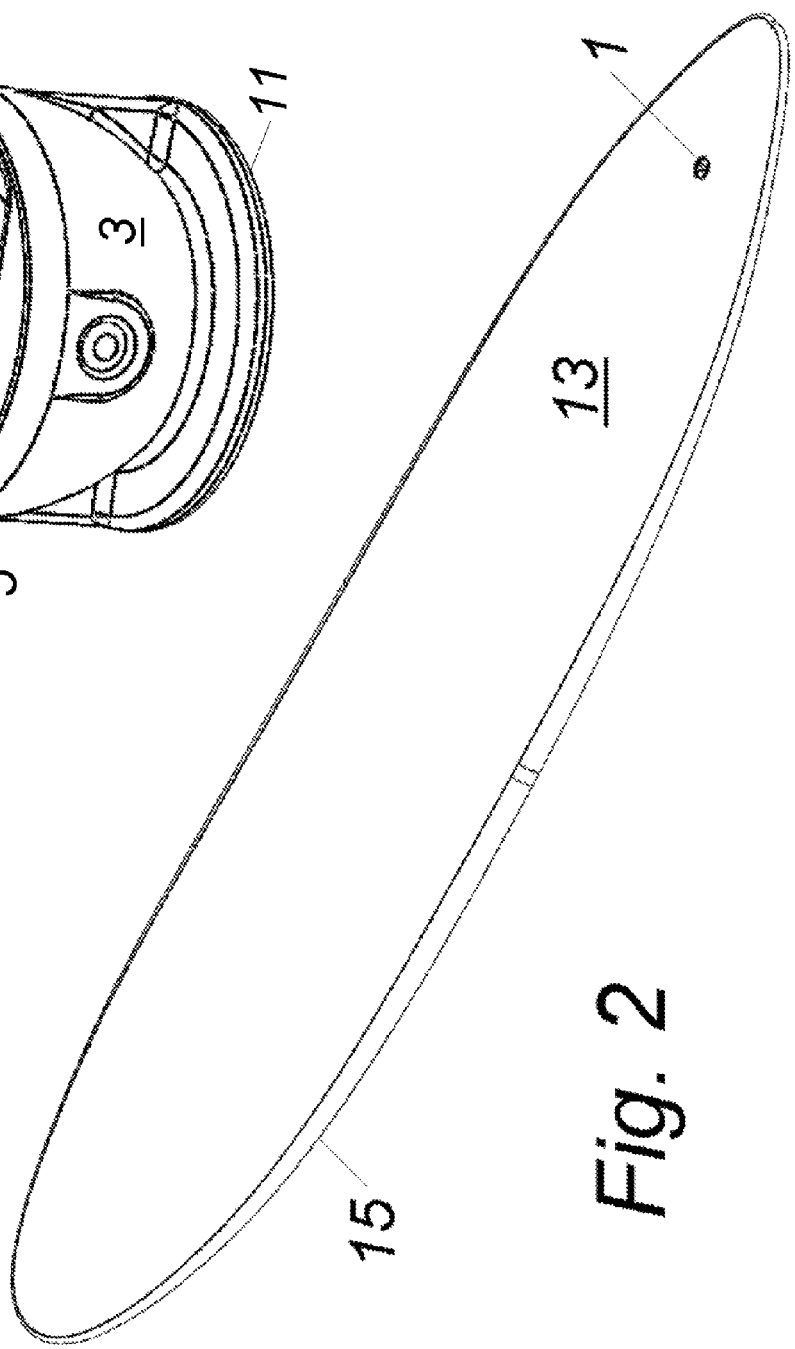

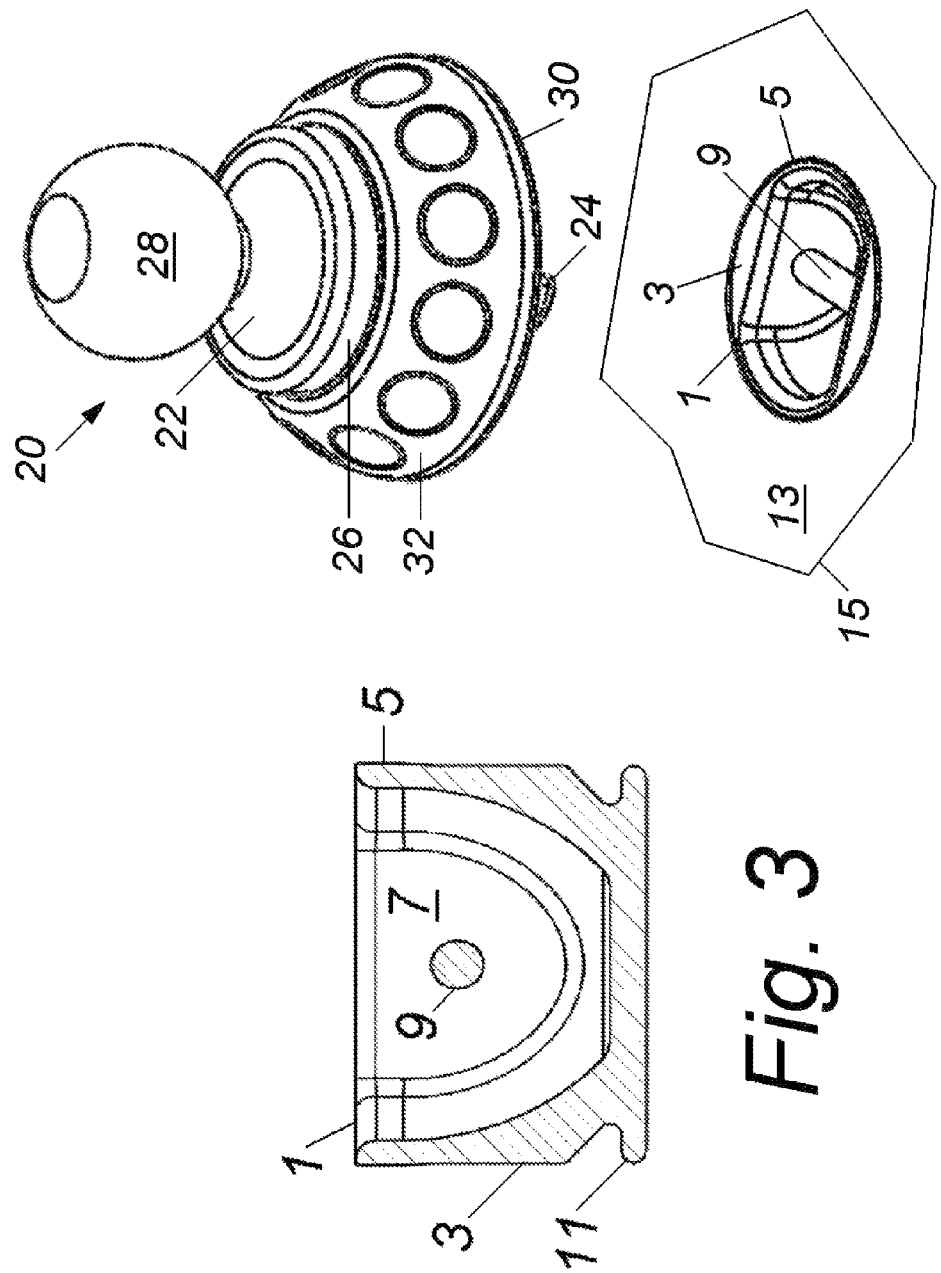

QUARTER-TURN ADAPTER FOR FLUSH MOUNT RECEPTACLE BASES

FIELD OF THE INVENTION

The present invention relates to an adapter for flush mount receptacle bases, and in particular to an adapter for securing a mounting base to a flush mount receptacle base.

BACKGROUND OF THE INVENTION

Flush mount receptacle bases are generally well-known for temporary mounting of accessories on object surfaces. Such receptacle bases are known for mounting flush with the object's mounting surface so as to not present a raised surface when not in use. Flush mount receptacle bases are in general use on air and water craft, and may be utilized wherever flush mounting is desirable to avoid obstacles intruding on the surface when the mount is not in use.

One example of flush mount receptacle bases is the so-called leash plug that is anchored in a surfboard, a stand-up paddle boards, and similar craft, whereby the operator is able to attach a security leash, which is a line of extruded polyurethane bearing a loop on its distal end for a surfer or paddle boarder to retain about his ankle. Thus, an ankle leash may be secured and extended from the upper surface of the surfboard. When the operator is thrown off his surfboard, the leash retains the surfboard. The leash plug is formed as a cup with a cross-bar that is set into the top major surface of the surfboard blank. However, the security leash of the prior art is limited to another loop of woven material on its proximal end for securing to the leash plug.

SUMMARY OF THE INVENTION

The present invention is a present invention is an adapter for mounting a mounting structure on a flush mount receptacle base. The adapter includes a mounting base and an anchor. The mounting base is formed with a rigid base having a mounting structure extended therefrom, and a threaded bore formed therein and communicating with a drive surface of the rigid base.

The anchor is formed of a shaft of a rigid material such as, but not limited to, a metal or a carbon fiber material. The shaft is threaded to mate with the threaded bore of the mounting base and defines a center axis of the shaft. The clamp has at least one hook adjacent to one end of the shaft, and the hook is laterally offset from the center axis of the shaft.

According to one aspect of the invention, the anchor has two hooks adjacent to the end of the shaft and rotationally fixed to the shaft and laterally offset therefrom on opposite sides of the center axis thereof.

According to another aspect of the invention, the two hooks are further symmetrically spaced apart on opposite sides of the center axis of the anchor shaft.

According to another aspect of the invention, the anchor has a flange adjacent to the end of the shaft, and each of the hooks further depends from the flange.

According to another aspect of the invention, each of the hooks is formed with a catch that is spaced away from the flange and affixed thereto by a shank, and each hook has a mouth opposite of the shank and defining an opening into the hook. The mouths of the hooks open in opposite directions and are oriented tangentially of the anchor shaft.

According to another aspect of the invention, the shaft is threaded along substantially an entire length thereof.

According to another aspect of the invention, an optional interface member may be interposed between drive surface of mounting base and the surface of the target substrate. The optional interface member, if present, provides slippage between the drive surface of the mounting base and the anchoring receptacle base in the target substrate. The optional interface member, if present, may alternatively have other functions.

According to another aspect of the invention, the interface member is a washer such as, but not limited to, either a flat washer or a lock washer such as a conical spring lock washer, helical spring lock washer, inside tooth lock washer or outside tooth lock washer. Such a minimal interface member is formed with an interface surface and a reaction surface spaced away therefrom with an aperture extending therethrough between the spaced apart interface surface and the reaction surface and is sized to pass the anchor shaft therethrough.

According to another aspect of the invention, the mounting structure is a ball mounting base.

According to another aspect of the invention, a method for attaching a mounting base to a flush mount receptacle base is provided. The method of the invention includes forming a mounting base and a cooperating anchor. Forming a mounting base includes forming a rigid base having a mounting structure extended therefrom opposite of a drive surface formed thereon, and forming a threaded bore in the base.

Forming an anchor according to the method of the invention includes forming a shaft of a rigid material with a first end portion thereof threaded to mate with the threaded bore in the base. According to another aspect of the method of the invention, the shaft is threaded along substantially an entire length thereof. At least one, and optionally two hooks, are positioned adjacent to a second end of the shaft opposite the threaded portion and rotationally fixed to the shaft and laterally offset therefrom. When the anchor is formed with two hooks, the two hooks are further symmetrically spaced apart on opposite sides of the center axis of the anchor shaft.

According to another aspect of the method of the invention, the anchor is formed with a flange adjacent to the end of the shaft, and each of the hooks further depends from the flange.

According to another aspect of the method of the invention, each of the hooks is formed with a catch that is spaced away from the flange and affixed thereto by a shank, and each hook is formed with a mouth opposite of the shank and defining an opening into the hook, with each hook having a catch rigidly affixed between the shank and the mouth. The mouths of the hooks open in opposite directions and are oriented tangentially of the anchor shaft.

According to another aspect of the method of the invention, an optional interface member is interposed between drive surface of mounting base and the surface of the target substrate. The optional interface member, if present, provides slippage between the drive surface of the mounting base and the anchoring receptacle base in the target substrate. The optional interface member, if present, may alternatively have other functions.

According to another aspect of the method of the invention, the interface member is provided as a washer such as, but not limited to, either a flat washer or a lock washer such as a conical spring lock washer, helical spring lock washer, inside tooth lock washer or outside tooth lock washer. Such a minimal interface member is formed with an interface surface and a reaction surface spaced away therefrom with an aperture extending therethrough between the spaced apart interface surface and the reaction surface and is sized to pass the anchor shaft therethrough. When present, the optional interface member is positioned with the reaction surface adjacent to the drive surface of the rigid base of the mounting base, with the aperture in the interface member aligned with the threaded bore formed in the drive surface of the rigid base. The threaded shaft of the anchor is passed through the aligned aperture of the interface member into threaded coupling with the mating threaded bore of the mounting base, and having the hooks extended from the interface member adjacent to the interface surface thereof.

The anchor shaft is partially received into the mounting base with the hooks extended from the drive surface of the mounting base, or extending from the interface surface of the interface member, if present. When the mounting base and anchor shaft are threaded, partially receiving the anchor shaft into the mounting base is accomplished by partially threading the anchor into the threaded bore of the mounting base with the hooks extended from the drive surface of the mounting base, or extending from the interface surface of the interface member, if present.

The mounting base is positioned adjacent to a flush mount receptacle base with the spaced-apart hooks of the anchor adjacent to a cross-bar in a cup of the receptacle base.

The mounting base is moved toward the receptacle base until the hooks are positioned adjacent to opposite sides of the cross-bar with the mouth openings thereof extended past the cross-bar.

The mounting base is rotated, which in turn rotates the hooks until the mouths of the hooks are passed over the cross-bar, and the shank of each hook engages the cross-bar, which is approximately a ninety (90) degree rotation of the anchor.

Rotation of the mounting base continues, while engagement of the shanks of the hooks with the cross-bar precludes further rotation of the anchor. Thereafter, the continued rotation of the mounting base draws the anchor shaft in an advancing direction for advancing the anchor shaft into the mounting base for engaging the catch of each hook with the cross-bar, and drawing the anchor shaft in the advancing direction continues until the catch of each hook is tight against the cross-bar of the receptacle base and the drive surface of the rigid base contacts the receptacle base.

When the optional interface member is present, the drive surface of the mounting base is tightened against the surface of the target substrate through the optional interface member. Continued rotation of the mounting base operates to frictionally engage the mounting base, through the optional interface member when present, with the surface of the target substrate for resisting loosening of engagement between the catches of the hooks and the cross-bar of the receptacle base.

According to another aspect of the invention, the method for attaching a mounting base to a flush mount receptacle base includes retreating the mounting base along the anchor shaft in a retreating direction opposite of the advancing direction for decompressing the shaft legs along the split, and retreating the mounting base in the retreating direction continues until the mouths of the hooks are retreated sufficiently to pass over the cross-bar of the receptacle base. Once the hooks have disengaged from the cross-bar, continued retreating rotation of the mounting base rotates the outside of the shanks of the hooks into the cross-bar, whereby the hooks are positioned on opposite sides of the cross-bar of the receptacle base and the rigid base separates from the receptacle base.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view that illustrates an example of a flush mount receptacle base of a type that is useful with the invention;

FIG. 2 illustrates one example of such a flush mount receptacle base being anchored in a target surface;

FIG. 3 is a section view that illustrates the example of FIG. 1 of a flush mount receptacle base of a type that is useful with the invention;

FIG. 4 illustrates the invention embodied by example and without limitation as an adaptive mounting apparatus for adapting flush mount receptacle bases to other uses;

DETAILED DESCRIPTION OF PREFERRED EMBODIMENT

Figure 5:
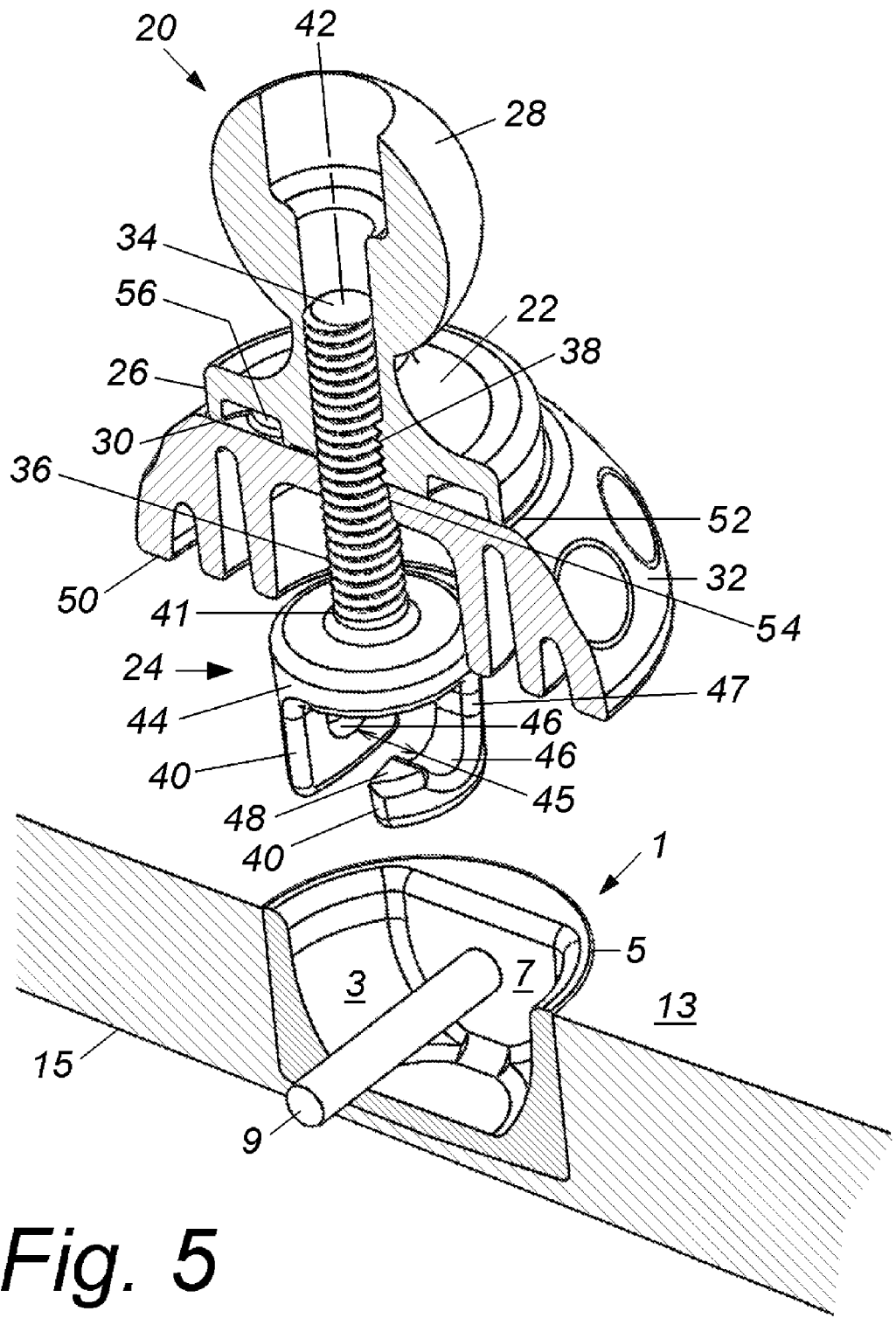
FIG. 5 is a section view of the adaptive mounting apparatus of the invention that is illustrated in FIG. 3.

As required, a detailed illustrative embodiment of the present protective enclosure is disclosed herein. However, techniques, systems and operating structures in accordance with the present protective enclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present protective enclosure. The following presents a detailed description of an illustrative embodiment (as well as some alternative embodiments) of the present protective enclosure.

In the Figures, like numerals indicate like elements.

FIG. 1 is a perspective view that illustrates an example of a flush mount receptacle base 1 of a type that is useful with the invention. Flush mount receptacle base 1 includes a cup portion 3 encircled at its top by an annular ridge 5 which may include a flange extension or rim (not shown) extending outwardly from annular ridge 5. An internal wall 7 of cup portion 3 depends downwardly from the top annular ridge 5. A cross-bar 9 crosses the top of the cup portion 3 and provides an attachment point for temporary mounting of accessories, such as a surfboard leash (not shown). Additionally, a flange 11 exterior of cup portion 3 is provided for anchoring receptacle base 1 in the surface 13 of a target substrate 15, such as a surfboard (shown), stand-up paddle boards, another similar craft, or other air or water craft. Alternatively, other anchoring means provided on cup portion 3 for anchoring receptacle base 1 include a flange extension or rim (not shown) extending outwardly from annular ridge 5 and adapted for being secured to the target surface with threaded fasteners; a threaded base formed exterior of cup portion 3; exterior of cup portion 3 being adapted to press-fit into the target surface; as well as other known means for securely anchoring such flush mount receptacle bases 1 in target surfaces.

FIG. 2 illustrates one example of such flush mount receptacle bases 1 being anchored in such a target surface 13. Here, flush mount receptacle bases 1 is anchored in a target surface 13 embodied by example and without limitation as the upper surface of a surfboard target substrate 15.

FIG. 3 is a section view of the example of FIG. 1 of a flush mount receptacle base of a type that is useful with the invention.

FIG. 4 illustrates the invention embodied by example and without limitation as an adaptive mounting apparatus 20 for adapting flush mount receptacle bases 1 to other uses.

Adapter 20 for flush mount receptacle bases 1 includes a mounting base 22 and an anchor 24. Mounting base 22 is formed with a rigid base 26 having a mounting structure 28 extended therefrom. Mounting structure 28 is illustrated here by example and without limitation as a ball mounting base. However, other structures are also known and are also contemplated for mounting structure 28 and may be substituted without deviating from the scope and intent of the present invention. As disclosed herein, mounting base 22 is formed with a threaded bore that extends through a drive surface 30 at rigid base 26.

An optional interface member 32 may be interposed between drive surface 30 of mounting base 22 and surface 13 of target substrate 15. Optional interface member 32, if present, provides slippage between drive surface 30 of mounting base 22 and cup portion 3 of anchoring receptacle base 1 in target substrate 15. Optional interface member 32, if present, may alternatively have other functions.

FIG. 5 is a cross-section of adapter 20 of the invention that is illustrated in FIG. 3, wherein anchor 24 is formed as a shaft 34 of a hard material including, but not limited to, a metal or a carbon fiber material. Shaft 34 is alternatively formed of a nylon, phenolic or another sturdy but lightweight plastic or thermoplastic material. Shaft 34 is formed with male thread 36, with male thread 36 matched to a female threaded bore 38 in mounting base 22. One or more hooks 40 are provided adjacent to an end 41 of anchor shaft 34 opposite of thread 36, with each hook 40 laterally offset from a center axis 42 of anchor shaft 34 to clear diameter of cross-bar 9 across top of cup portion 3 of receptacle base 1. For example, anchor shaft 34 is formed with a flange 44 at one end aligned along shaft axis 42, with one or two hooks 40 set on outer periphery of flange 44. When anchor 24 is formed with two hooks 40 (shown), hooks 40 are symmetrically laterally spaced apart on opposite sides of anchor shaft 34 a sufficient width (arrows 45) to admit cross-bar 9 therebetween, each hook 40 is thus offset one-half width 45 from axis 42 of shaft 34. Width 45 may provide a small clearance between spaced apart hooks 40 and cross-bar 9. A catch 46 of each hook 40 is extended by a shank 47 thereof and faces toward end 41 of anchor shaft 34 and flange 44, while a mouth 48 of each hook 40 opposite shank 47 faces tangentially of shaft axis 42. When two hooks 40 (shown) are provided, mouths 48 of hooks 40 face in opposite directions from shaft axis 42, as more clearly illustrated in FIG. 6.

Optionally, adapter 20 mounts directly to surface 13 of a target substrate 15 at annular ridge 5 of receptacle base cup 3. Alternatively, optional interface member 32 may be interposed therebetween. Optional interface member 32, if present, includes an interface surface 50 and a reaction surface 52 spaced away therefrom with an aperture 54 extending therethrough between spaced apart interface surface 50 and reaction surface 52 and sized to pass anchor shaft 34 therethrough. According to one embodiment, interface member 32 merely provides friction relief and slippage between drive surface 30 of mounting base 22 and cup portion 3 of anchoring receptacle base 1 in target substrate 15. Optional interface member 32, if present, may have other functions. For example, optional interface member 32, if present, may provide an interlock mechanism 56 for fixing rotation of adapter 20 relative to receptacle base 1 and target substrate 15.

FIG. 5 illustrates adapter 20 at the beginning of installation into receptacle base 1. Adapter 20 is shown having anchor 24 inserted into mounting base 22 with male thread 36 on anchor shaft 34 threaded into mating female threaded bore 38 in mounting base 22 through drive surface 30 at rigid base 26 thereof. Anchor shaft 34 passes through clearance hole 54 in interface member 32, if present, positioned between drive surface 30 of mounting base 22 and anchor flange 44.

Prior to installation of adapter into receptacle base 1, threads 36 of anchor shaft 34 and threads 38 of mounting base 22 are relatively rotated for extending anchor 24 from drive surface 30 of adapter 20, such that mouth 48 of each hook 40 is extended farther from drive surface 30 at rigid base 26 of adapter 20, or interface surface 50 of optional interface member 32 if present, than cross-bar 9 is set into cup 3 of receptacle base 1. Accordingly, mouth 48 of each hook 40 is extended into cup 3 past cross-bar 9 of receptacle base when drive surface 30 of adapter 20, or interface surface 50 of optional interface member 32 if present, is engaged with either annular ridge 5 cup 3 of receptacle base 1 or surface 13 of target substrate 15, as shown in FIG. 6.

During installation into receptacle base 1, anchor 24 of adapter 20 is brought to receptacle base 1, and hooks 40 are positioned adjacent to cross-bar 9 in cup portion 3. When gap 45 between hooks 40 is the same or larger than the diameter of cross-bar 9 (FIG. 6), as shown, hooks 40 of anchor 24 are simply slipped over cross-bar 9. Else, if gap 45 is smaller than the diameter of cross-bar 9, anchor 24 is pressed into cup 3 with hooks 40 in interference contact with cross-bar 9. As a result of pressure (arrow 58) applied along anchor shaft 34 through mounting structure 28, hooks 40 of anchor 24 are spread apart over cross-bar 9, thus spreading opposing hooks 40 along lengthwise axis 42 and opening gap 45. The material of anchor shaft 34 allows gap 45 to open sufficiently to receive cross-bar 9 between hooks 40 of anchor 24.

Figure 6:
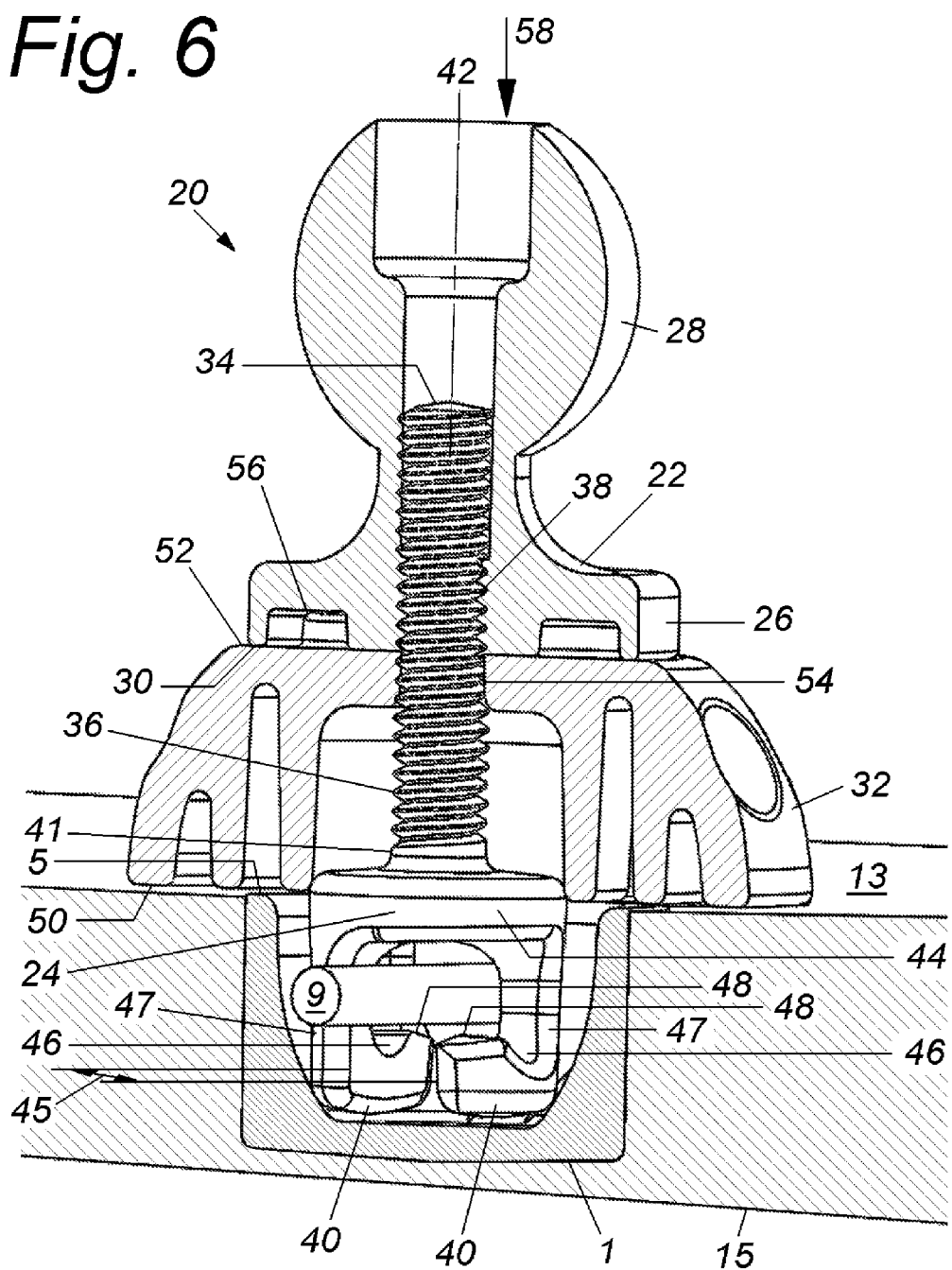
FIG. 6 is a section view of the adaptive mounting apparatus of the invention during installation into the receptacle base.

FIG. 6 illustrates adapter 20 during installation into receptacle base 1. Either gap 45 between hooks 40 is wide enough to straddle cross-bar 9 of receptacle base 1, or as a result of pressure (arrows 58) applied along anchor shaft 34, and the material of anchor shaft 34 allows gap 48 to spread open sufficiently to receive cross-bar 9 between hooks 40. Adapter 20 is moved into cup 3 of receptacle base 1 until mouth 48 of each hook 40 is extended past cross-bar 9 below surface 13 of target substrate 15, as shown.

Figure 7:
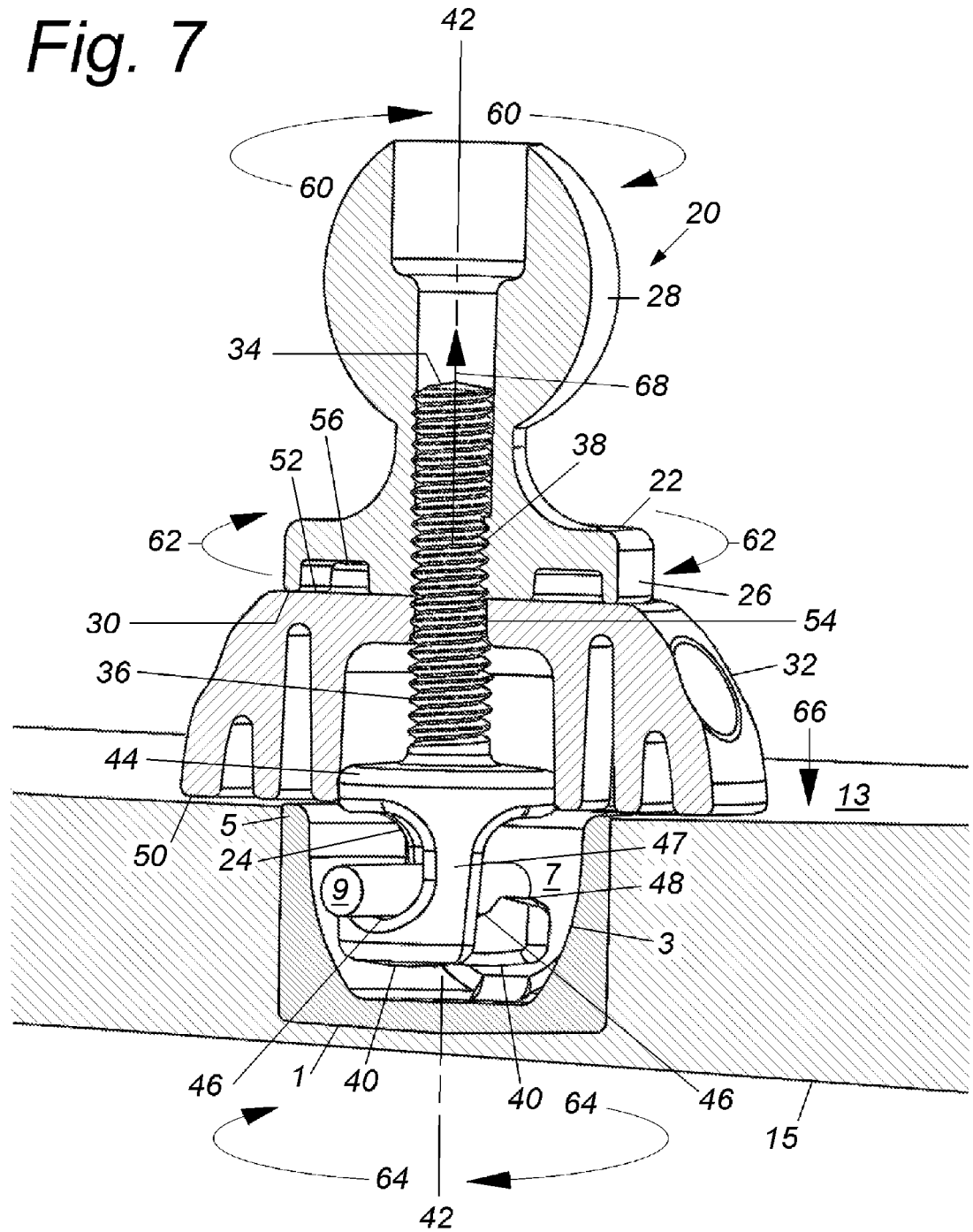
FIG. 7 is a section view of the adaptive mounting apparatus of the invention during installation into the receptacle base.

FIG. 7 illustrates clamping of anchor 24 over cross-bar 9. When hooks 40 of anchor 24 are positioned on opposite sides of cross-bar 9 with mouth 48 of each hook 40 extended past cross-bar 9 below surface 13 of target substrate 15, as shown in FIG. 6, then mounting base 22 is engagingly rotated (arrows 60) relative to anchor 24. Accordingly, female threaded bore 38 in mounting base 22 is engagingly rotated (arrows 62) relative to male thread 36 of anchor shaft 34, whereby flange 44 of anchor 24 and anchor hooks 40 fixed thereon are engagingly rotated (arrows 64) about axis 42. Rotation (arrows 64) of anchor flange 44 and affixed anchor hooks 40 rotates mouths 48 of hooks 40 over cross-bar 9 of receptacle base 1 until shank 47 engages cross-bar 9, which is an approximately ninety (90) degree rotation of anchor 24. Thereafter, continued rotation (arrows 60) of mounting base 22 forces (arrow 66) drive surface 30 of mounting base 22 against surface 13 of target substrate 15, through optional interface member 32 when present, which causes female threads 38 to rotate (arrows 62) on male threads 36 for drawing (arrow 68) anchor shaft 34 along axis 42 outwardly of adapter mounting base 22 away from surface 13 of target substrate 15, whereby catches 46 of hook 42 engage cross-bar 9. Continued rotation (arrows 60) of mounting base 22 operates to frictionally engage mounting base 22, through optional interface member 32 when present, with surface 13 of target substrate 15 for resisting loosening of engagement between catches 46 of hooks 42 and cross-bar 9 of receptacle base 1.

Figure 8:
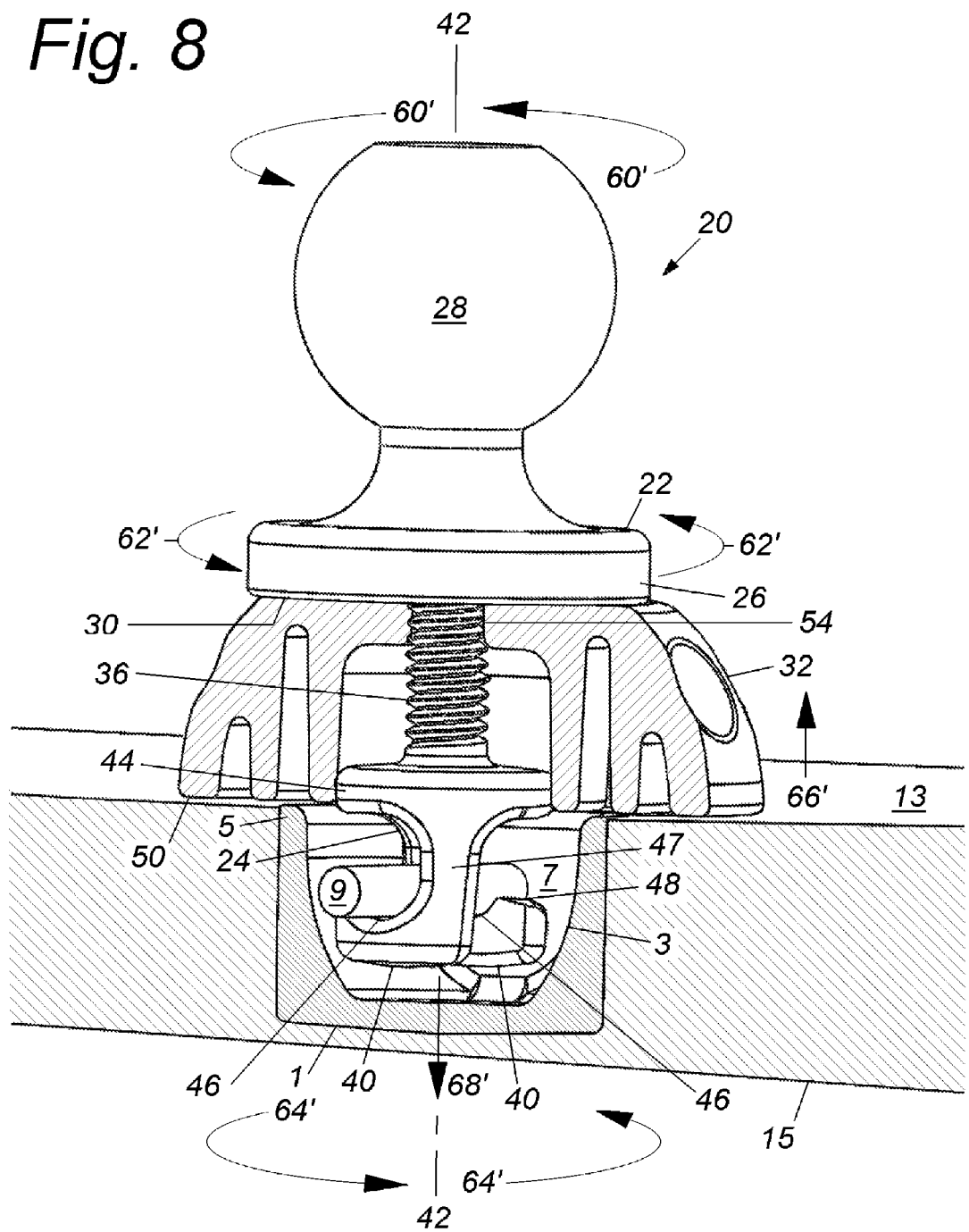
FIG. 8 is a section view of the adaptive mounting apparatus of the invention during releasing of the anchor from the cross-bar of the flush mount receptacle base.

FIG. 8 illustrates releasing anchor 24 from cross-bar 9 and flush mount receptacle base 1. Here, anchor 24 is disengaged from cross-bar 9 by rotating (arrows 60') mounting base 22 relative to anchor 24 oppositely of engaging rotation (arrows 60) of FIG. 7. Accordingly, female threaded bore 38 in mounting base 22 is disengagingly rotated (arrows 62') relative to male thread 36 of anchor shaft 34, whereby anchor shaft 34 with flange 44 of anchor 24 and anchor hooks 40 fixed thereon are retreated (arrow 68') along axis 42 away from adapter mounting base 22 and deeper into surface 13 of target substrate 15, whereby catches 46 of hooks 42 retreat and disengage from cross-bar 9. Continued retreating rotation of (arrows 60') of mounting base 22 operates to disengage mounting base 22, or optional interface member 32 when present, from surface 13 of target substrate 15 until mouths 48 of hooks 40 clear cross-bar 9 of receptacle base 1. Thereafter, retreating rotation (arrows 60') mounting base 22 causes disengaging rotation (arrows 64') of hooks 40 about axis 42, whereby cross-bar 9 of receptacle base 1 passes out of mouths 48 of anchor hooks 40. Thereafter, anchor 24 is disengaged from receptacle cross-bar 9 and mounting base 22 can be lifted away (arrow 66') from surface 13 of target substrate 15 for releasing adapter 20 from receptacle base 1.

Figure 9:
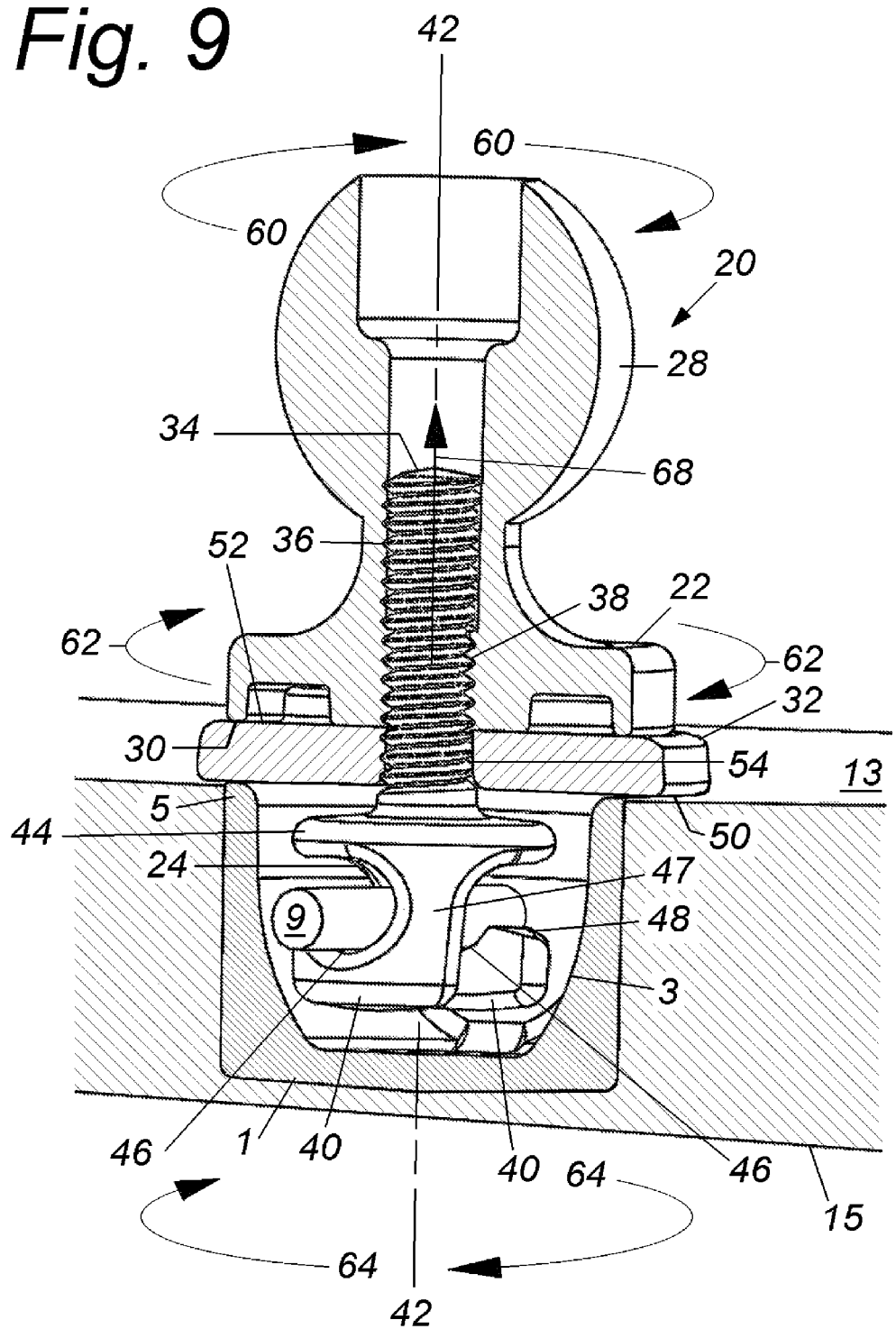
FIG. 9 is a section view of the adaptive mounting apparatus of the invention, wherein an optional interface member interposed between a drive surface of the mounting base and the surface of the target substrate is a minimal device including, but not limited to, a washer.

FIG. 9 illustrates adaptive mounting apparatus 20 of the invention, wherein optional interface member 32 interposed between drive surface 30 of mounting base 22 and surface 13 of target substrate 15 may be a minimal device including, but not limited to, a washer including, but not limited to, either a flat washer or a lock washer such as a conical spring lock washer, helical spring lock washer, inside tooth lock washer or outside tooth lock washer. Such minimal interface member 32 is formed with interface surface 50 and reaction surface 52 spaced away therefrom with aperture 54 extending therethrough between spaced apart interface surface 50 and reaction surface 52 and sized to pass anchor shaft 34 therethrough.

Figure 10:
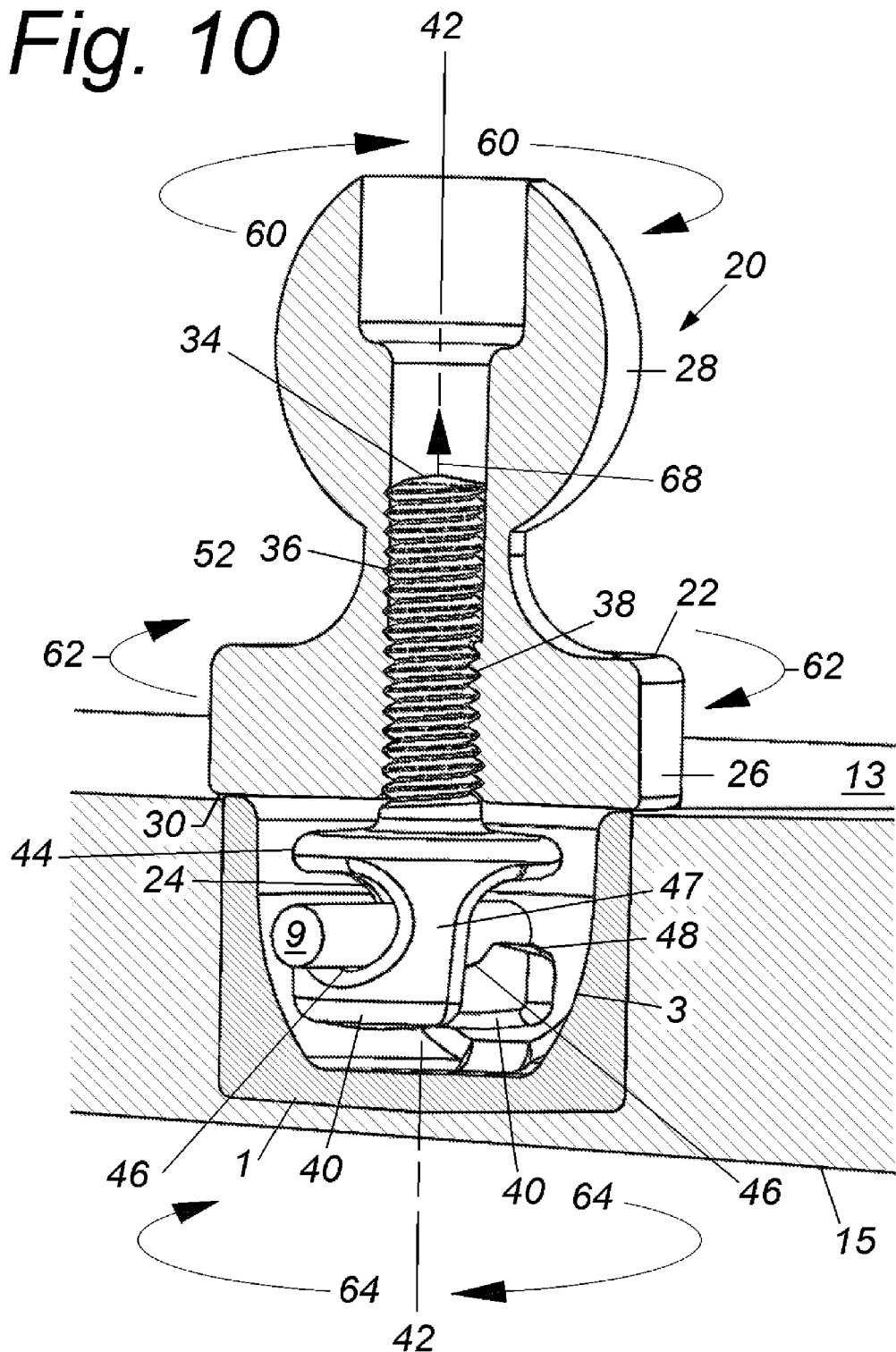
FIG. 10 is a section view of the adaptive mounting apparatus of the invention, wherein an optional interface member is removed from between a drive surface of the mounting base and the surface of the target substrate.

FIG. 10 illustrates adaptive mounting apparatus 20 of the invention, with optional interface member 32 absent from between drive surface 30 of mounting base 22 and surface 13 of target substrate 15, whereby adapter 20 mounts directly to surface 13 of a target substrate 15 at annular ridge 5 of receptacle base cup 3. Accordingly, drive surface 30 at rigid base 26 provides the interface surface between adapter mounting base 22 and surface 13 of target substrate 15.

Figure 11:
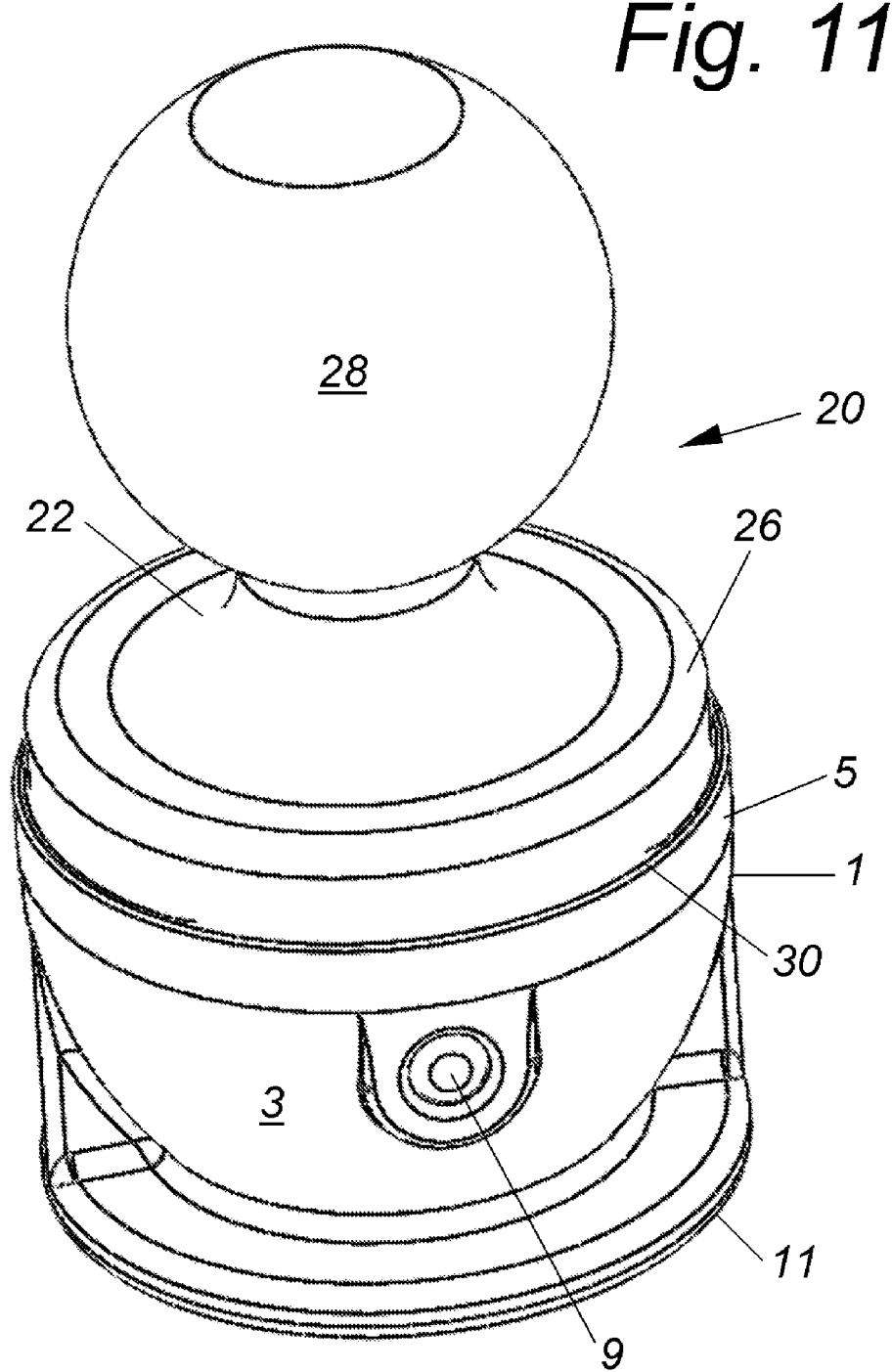
FIG. 11 illustrates the adapter of the invention emplaced on flush mount receptacle base.

FIG. 11 illustrates adapter 20 emplaced on flush mount receptacle base 1.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A method of mounting a mounting adapter to a flush mount receptacle resident on a water craft, wherein the flush mount receptacle comprises a receptacle base formed as a cup with an opening thereinto that is encircled by an internal wall that depends downwardly from a top annular ridge around the opening with a cross-bar that crosses the cup portion and provides an attachment point for temporary mounting of accessories, the method comprising:

using a mounting adapter, comprising a drive member having a base form with a drive surface and a mounting structure extended therefrom, and a bore formed in the drive member with a portion of the bore being threaded; and an anchor formed with a shaft that is threaded to mate with the threaded portion of the bore of the drive member and defines a center axis, and a first hook adjacent to one end of the shaft, wherein the first hook is laterally offset from the center axis of the shaft, initially rotating the threaded shaft of the anchor relative to the threaded portion of the bore of the drive member for extending the anchor from the drive surface of the drive member such that a mouth of the first hook is extended farther from the drive surface of the drive member than the cross-bar is set into the cup of the receptacle base;

positioning the mounting adapter adjacent to the flush mount receptacle with the base proximal to the opening into the cup of the receptacle base and the anchor extended into the cup of the receptacle with the first hook positioned beside the cross-bar;

rotating the anchor for engaging the first hook with the cross-bar; and rotating the drive member of the mounting adapter relative to the anchor for retracting the anchor relative to the cup of the receptacle until the first hook of the anchor is retained in the cup of the receptacle by engagement with the cross-bar.

2. The method of claim 1, wherein the anchor further comprises a second hook spaced away from the first hook and substantially parallel therewith;

wherein positioning the mounting adapter adjacent to the flush mount receptacle further comprises extending both the first and second hooks into the cup of the receptacle with the first and second hooks positioned beside the cross-bar on opposite sides thereof;

wherein rotating the anchor further comprises engaging both the first and second hooks with the cross-bar; and wherein rotating the drive member of the mounting adapter relative to the anchor further comprises retracting the anchor relative to the cup of the receptacle until both the first and second hooks of the anchor are retained in the cup of the receptacle by engagement with the cross-bar.

3. The method of claim 1, wherein positioning the mounting adapter adjacent to the flush mount receptacle with the base proximal to the opening into the cup of the receptacle base further comprises interposing an interface member between the drive surface of the mounting base and the internal wall encircling the opening thereinto with the anchor extended through an aperture in the interface member into the cup of the receptacle with the first hook positioned beside the cross-bar.

4. The method of claim 3, wherein interposing an interface member between the drive surface of the mounting base and the internal wall encircling the opening thereinto further comprises interposing a washer between the drive surface of the mounting base and the internal wall encircling the opening thereinto.

5. The method of claim 4, wherein interposing a washer between the drive surface of the mounting base and the internal wall encircling the opening thereinto further comprises interposing a lock washer between the drive surface of the mounting base and the internal wall encircling the opening thereinto.

6. The method of claim 1, wherein the mounting structure extended from the drive member of the mounting adapter further comprises a ball mounting base.

7. The method of claim 1, wherein the anchor further comprises a flange adjacent to the end of the shaft and a second hook, wherein the first and second hooks depend from the flange and are symmetrically spaced apart on opposite sides of the center axis of the anchor shaft.

8. A method of mounting a mounting apparatus to a flush mount receptacle resident on a water craft, wherein the flush mount receptacle comprises a receptacle base formed as a cup with an opening thereinto that is encircled by an internal wall that depends downwardly from a top annular ridge that provides a mounting surface around the opening and having a cross-bar spaced into and extended across the cup portion such that the cross-bar is supported at opposite ends by opposing portions of the internal wall of the cup portion with an unobstructed length supported at opposite ends thereof between the opposing portions of the internal wall of the cup portion, whereby the cross-bar provides an attachment point for temporary mounting of accessories, the method comprising:

providing a mounting apparatus, comprising a rotatable drive member having an interface surface configured and arranged for placement on the mounting surface of the flush mount receptacle and a bore extending into the rotatable drive member and aligned with the interface surface, wherein at least a portion of the bore is threaded; and an anchor member configured and arranged to extend into the bore of the drive member, the anchor member having a shaft having a first end portion and a second end portion and defining a center axis, wherein at least the first end portion of the shaft is threaded to mate with the threaded portion of the bore of the drive member and configured and arranged to rotate relative to the drive member, the anchor member further comprising at least one hook coupled to the second end portion of the shaft and laterally offset from the center axis of the shaft;

initially rotating the threaded first end portion of the shaft of the anchor member relative to the threaded portion of the bore of the rotatable drive member for extending the anchor from the interface surface of the drive member such that a mouth of the at least one hook is extended farther from the interface surface of the drive member than the cross-bar is spaced into the cup of the receptacle base;

positioning the mounting apparatus adjacent to the flush mount receptacle with the interface surface proximal to the opening into the cup of the receptacle base and the anchor member extended into the cup of the receptacle with the at least one hook positioned beside the cross-bar;

rotating the anchor member for engaging the at least one hook with the cross-bar along the unobstructed length between the opposing portions of the internal wall of the cup portion of the flush mount receptacle resident on the water craft; and rotating the rotatable drive member of the mounting apparatus relative to the anchor member for retracting the anchor member relative to the cup of the receptacle until the at least one hook of the anchor member is retained in the cup of the receptacle by engagement with the cross-bar.

9. The method of claim 8, wherein the rotatable drive member further comprises a mounting base comprising the threaded bore of the rotatable drive member and a drive surface at a rigid base thereof, and the rotatable drive member further comprising an interface member between the drive surface of the mounting base and the mounting surface of the flush mount receptacle, the interface member comprising the interface surface of the rotatable drive member that is configured and arranged for placement on the mounting surface of the flush mount receptacle, a reaction surface opposite of the interface surface thereof and configured for receiving thereagainst the drive surface of the mounting base, and an aperture extending through the interface member;

wherein providing the mounting apparatus further comprises positioning the mounting base of the rotatable drive member with the drive surface positioned on the reaction surface of the interface member, and the mounting base being rotatable relative to the interface member; and wherein the threaded first end portion of the shaft of the anchor member is further configured and arranged to extend through the aperture of the interface member and projected from the reaction surface of the interface member into the bore of the drive member with the at least one hook extended from the aperture of the interface member adjacent to the interface surface thereof.

10. The method of claim 8, wherein the at least one hook of the anchor member comprises two hooks coupled to the second end portion of the shaft and symmetrically spaced apart on opposite sides of the center axis of the anchor shaft and positioned for engaging with the cross-bar along the unobstructed length between the opposing portions of the internal wall of the cup portion of the flush mount receptacle resident on the water craft.

11. The method of claim 10, wherein each of the two hooks comprises a shank, a catch spaced away from the second end portion of the shaft and depending from the shank, and a mouth opening opposite of the shank, wherein the mouths of the hooks open in opposite directions and tangentially of the anchor shaft.

12. A method of mounting a mounting adapter to a flush mount receptacle resident on a water craft, wherein the flush mount receptacle comprises a receptacle base formed as a cup with an opening thereinto that is encircled by an internal wall that depends downwardly from a top annular ridge around the opening with a cross-bar that crosses the cup portion and is supported at opposite ends thereof by opposing portions of the internal wall of the cup portion with unsupported length between the opposite ends thereof, wherein the cross-bar provides an attachment point for temporary mounting of accessories, the method comprising:
- using a mounting adapter, a rotatable drive member comprising a rigid base having a drive surface formed thereon and a mounting structure extended therefrom, and a threaded bore formed in the drive surface; and an anchor comprising a shaft that is threaded to mate with the threaded bore of the drive member, and a first hook adjacent to one end of the shaft, wherein the first hook is rotationally fixed to and laterally offset from the shaft
- initially rotating the threaded shaft of the anchor relative to the threaded bore of the rotatable drive member for extending the anchor from the drive surface of the rotatable drive member such that a mouth of the first hook is extended farther from the drive surface of the rotatable drive member than the cross-bar is set into the cup of the receptacle base;
- positioning the mounting adapter adjacent to the flush mount receptacle with the rigid base proximal to the opening into the cup of the receptacle base and the anchor extended into the cup of the receptacle with the first hook positioned beside the cross-bar;
- rotating the anchor for engaging the first hook with the cross-bar along the unsupported length between the opposite ends thereof; and
- retracting the anchor relative to the cup of the receptacle until the first hook of the anchor is retained in the cup of the receptacle by engagement with the cross-bar by rotating the rotatable drive member of the mounting adapter relative to the anchor.

13. The method of claim 12, wherein the rotatable drive member further comprises an interface member comprising an interface surface and a reaction surface spaced away therefrom, and an aperture extending therethrough between the interface and reaction surfaces,
- wherein the rigid base of the rotatable drive member is configured for positioning the drive surface thereof on the reaction surface of the interface member with the threaded bore of the rigid base aligned with the aperture of the interface member, and
- wherein the shaft of the anchor of the rotatable drive member is configured for extending through the aperture of the interface member with the first hook extended adjacent to the interface surface thereof.

14. The method of claim 13, wherein the interface member further comprises a washer.

15. The method of claim 14, wherein the washer comprises a lock washer.

16. The method of claim 12, wherein the mounting structure comprises a ball mounting base.

17. The method of claim 12, wherein a material of the shaft is a metal or a carbon fiber material.

18. The method of claim 12, wherein the anchor further comprises a second hook adjacent to the one end of the shaft and rotationally fixed to the shaft and laterally offset therefrom, wherein the first and second hooks are disposed on opposite sides of a center axis of the shaft.

19. The method of claim 18, wherein the first and second hooks are symmetrically spaced apart on opposite sides of the center axis of the shaft.

20. The method of claim 19, wherein the anchor further comprises a flange adjacent to the one end of the shaft, and wherein each of the first and second hooks depends from the flange.

21. The method of claim 20, wherein each of the first and second hooks comprises a shank, a catch spaced away from the flange and affixed to the shank, and a mouth opposite of the shank and defining an opening into the hook.

* * * * *